United States Patent [19]

Johnson et al.

[11] 4,404,178

[45] Sep. 13, 1983

[54] APPARATUS AND METHOD FOR PRODUCING CARBON BLACK

[75] Inventors: Paul H. Johnson, Bartlesville, Okla.; Harwell E. Benjamin, Ang Thong, Thailand

[73] Assignee: Phillips Petroleum Company, Bartlesville, Okla.

[21] Appl. No.: 121,764

[22] Filed: Feb. 15, 1980

Related U.S. Application Data

[63] Continuation-in-part of Ser. No. 930,630, Aug. 3, 1978, abandoned.

[51] Int. Cl.$^3$ .......................... C01B 31/02; C09C 1/48
[52] U.S. Cl. ..................................... 423/450; 423/461; 422/150; 165/95
[58] Field of Search ............... 423/449, 461, 450, 434, 423/445; 422/150; 165/95

[56] References Cited

U.S. PATENT DOCUMENTS

| | | | |
|---|---|---|---|
| 1,767,089 | 6/1930 | Miller | 423/450 |
| 1,916,337 | 7/1933 | Schmidt | 165/1 |
| 2,500,968 | 3/1950 | Venuto | 23/314 |
| 2,564,700 | 8/1951 | Krejci | 23/209.4 |
| 2,861,294 | 11/1958 | Glaxner et al. | 18/1 |
| 2,867,513 | 1/1959 | Boyer | 23/314 |
| 3,050,378 | 8/1962 | Kron | 23/314 |
| 3,102,005 | 8/1963 | Dye | 23/314 |
| 3,168,383 | 2/1965 | Loewen | 34/137 |
| 3,293,003 | 12/1966 | Jones et al. | 23/314 |
| 3,333,038 | 7/1967 | Walenciak | 264/117 |
| 3,347,638 | 10/1967 | Gerdes | 23/314 |
| 3,369,870 | 2/1968 | Ganz et al. | 423/450 |
| 3,989,473 | 11/1976 | Henderson | 23/314 |
| 4,302,423 | 11/1981 | Cheng et al. | 423/450 |

*Primary Examiner*—Gregory A. Heller

[57] ABSTRACT

Combustion gases containing free oxygen and a carbonaceous feed are introduced into a carbon black reactor, with the combustion gases being at a temperature sufficient to pyrolyze the feed hydrocarbon to produce combustion products containing particulate carbon black. The combustion products are cooled by quenching to form a gaseous effluent containing particulate carbon black. The effluent is discharged from the reactor to an indirect heat exchange means for further cooling the effluent. Carbon black is introduced into the effluent inlet of the indirect heat exchange means for removing carbon black which has become deposited on surfaces defining the flow path or flow paths for the effluent flowing through the heat exchange means. The effluent after cooling in the indirect heat exchange means is passed to separating means for separating the effluent into a gaseous portion and a particulate carbon black portion. Thereafter, the particulate carbon black portion can be pelleted.

34 Claims, 1 Drawing Figure

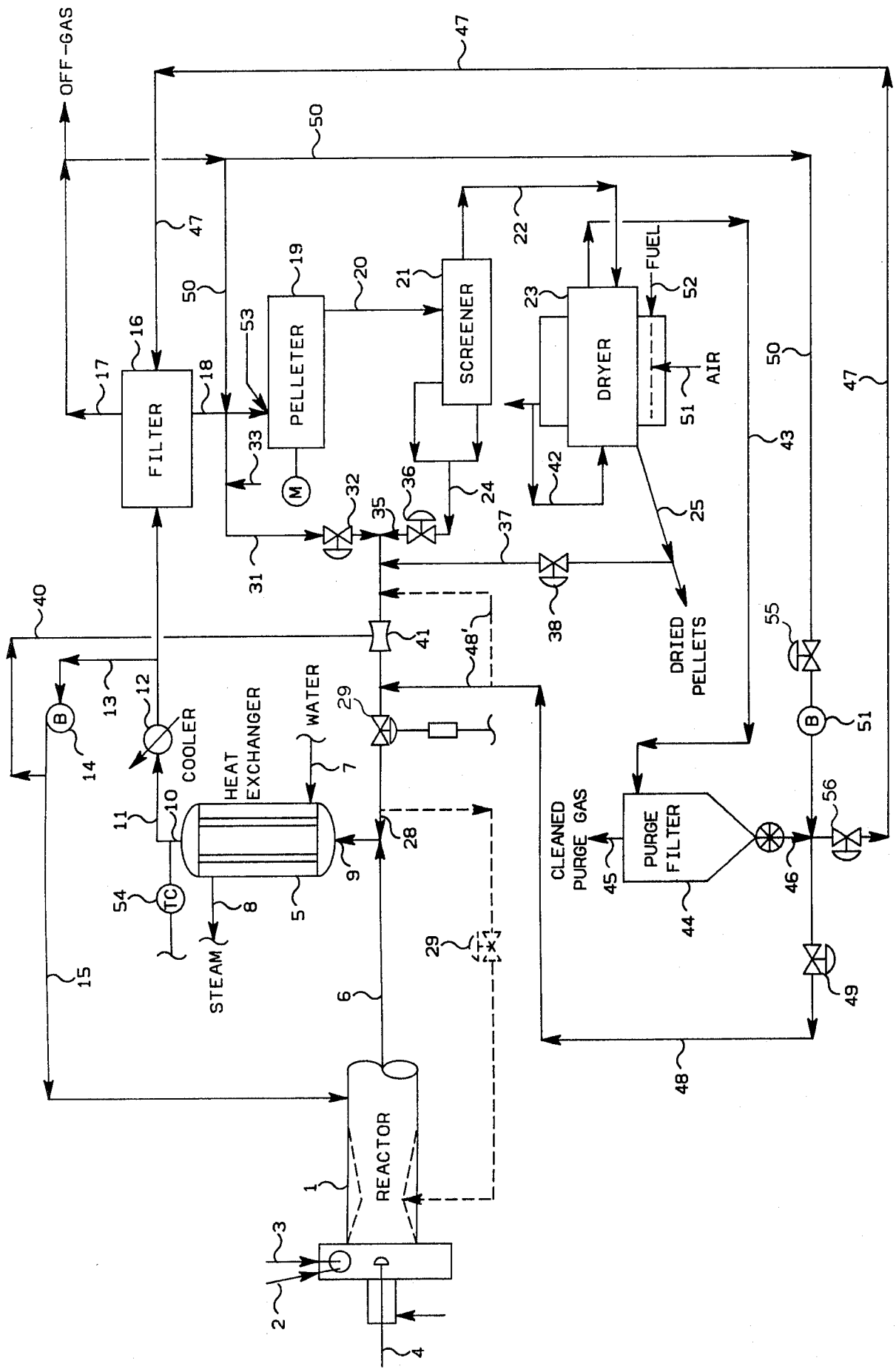

APPARATUS AND METHOD FOR PRODUCING CARBON BLACK

This application is a continuation-in-part of copending application Ser. No. 930,630, filed Aug. 3, 1978 now abandoned.

The present invention relates to a method and apparatus for producing carbon black by the pyrolysis of a carbonaceous feed.

In a typical furnace black process a carbonaceous feed is introduced into a reactor and contacted with hot combustion gases which elevate the temperature of the feed to a temperature sufficiently high to decompose the feed to form combustion products containing particulate carbon black. Such combustion products are typically at a temperature in the range of about 2400° F. to about 2900° F. The combustion products are cooled, usually by introducing a quench fluid into the combustion products to form an effluent (sometimes referred to as smoke) containing particulate carbon black. The effluent is subsequently separated into a gas phase and a particulate carbon black phase by separating means such as a cyclone separator, bag filters or the like. However, before the filtering or separation step, the effluent should be cooled to a temperature sufficiently low to prevent damage to the separating means. A plurality of cooling steps can be employed.

It is common practice to initially cool or quench the combustion products by injecting directly thereinto quench fluid at one or more points in a quench chamber portion of the reactor. Typical quench fluids include water, cooled effluent or smoke, and/or off-gas, off-gas being a portion of the gas phase separated from the effluent. Such a first cooling step normally lowers the temperature of the combustion products to a temperature of about 2000° F. or less, and preferably between about 1500° F. and 2000° F. The first cooling is done to lower the temperature of the combustion products to a temperature which can be safely accommodated in an indirect heat exchange means and to a temperature below which no further production of carbon black occurs.

A second step of cooling involves the use of a first indirect heat exchange means such as a shell-tube heat exchanger which further lowers the temperature of the effluent to a temperature of about 1200° F. or less and preferably between about 800° F. and about 1200° F. The thus cooled effluent can then be passed to one or more economizers, e.g., indirect heat exchangers which are operable for heating air and/or feed to be introduced into the reactor. It is also common practice in the art to finally cool the effluent by injecting a trim quench fluid into the effluent before separating effluent. The final cooling lowers the temperature of the effluent to a temperature which can be safely accommodated by the separating means. Typically, this temperature would be below about 600° F. for bag filters. However, this temperature is dependent upon the type of bag filters used or the type of separating means used. However, one problem encountered is that carbon black deposits tend to build up in the first indirect heat exchanger. A thin layer of the carbon black will substantially lower the heat transfer rate in the indirect heat exchanger. To clean the indirect heat exchanger to maintain high heat transfer rate, the reactor can be shut down and allowed to cool to a temperature at which the indirect heat exchanger can be partially disassembled for cleaning by methods well known in the art to remove carbon black deposits. However, such a cleaning method is wasteful as the apparatus must be shut down to effect the cleaning and the indirect heat exchanger must be partially disassembled for cleaning. After the cleaning operation, the apparatus is placed back in operation and allowed a period of operating time, which can be several hours, to stabilize before the production of carbon black is commenced. Such a method is wasteful of manhours, fuel and production time.

The present invention provides a method and apparatus for producing carbon black which allows for cleaning of the indirect heat exchanger without the aforementioned problems. Briefly, our invention comprises, in a method for producing carbon black wherein the carbon black is cooled by being passed through means defining a flow path of an indirect heat exchanger in which carbon black deposits are laid down which reduce heat transfer efficiency, the step of flowing additional cleaning carbon black into the heat exchanger to increase the concentration of carbon black flowing therethrough to a cleaning concentration effective to remove at least a portion of such deposits from the heat exchanger. In one broad aspect of the invention the additional cleaning carbon black can be flowed through the heat exchanger continuously. In another broad aspect of the invention, this removal of carbon black deposits is accomplished by intervallically introducing cleaning carbon black into the effluent inlet to the indirect heat exchanger for a short period of time in a quantity sufficient for removing at least a portion of the deposited carbon black. Such intervallic introduction of carbon black can be at predetermined timed intervals or when it has been determined that the heat transfer rate within the indirect heat exchanger falls below a predetermined level as, for example, by monitoring the temperature of the effluent exiting from the indirect heat exchanger.

In accordance with yet another broad aspect of the invention, our invention comprises apparatus for producing carbon black whereby additional cleaning carbon black can be introduced, continuously or intervallically, into means defining a flow path of a heat exchanger to maintain heat transfer efficiency.

Continuous introduction of cleaning carbon black can be accomplished without interrupting carbon black production at all. By practicing intervallically such a method of cleaning in accordance with our invention, the heat exchanger need not be disassembled, nor is a long period of operation of the reactor required for stabilization before carbon black can be produced once again. Intervallic cleaning by such a method can be accomplished in a very short period of time as, for example, in about 10 seconds or even less which will be partly dependent on the time period between cleanings. The intervallic cleaning operation in accordance with this invention can be conducted by a suitable length of time as, for example, 2 seconds when conducted about 24 times each hour.

It is an object of this invention to provide a method of producing carbon black which can be operated substantially continuously without need of completely terminating operation for cleaning of an indirect heat exchanger to maintain the heat exchange rate in a desired range. It is a further object of the present invention to provide an apparatus to accomplish such a method.

Other objects and advantages of the present invention will become apparent from the following detailed description taken in connection with the accompanying drawings wherein are set forth by way of illustration and example certain embodiments of this invention.

FIG. 1 is a schematic illustration of a carbon black producing apparatus.

The reference numeral 1 designates generally a carbon black reactor of any suitable type. Air is introduced into the reactor 1 via an inlet 2 and fuel is introduced into the reactor 1 via an inlet 3. A carbonaceous feed is introduced into the reactor 1 via an inlet 4. Air and fuel introduced via the inlets 2 and 3, respectively, can be combusted before introduction into the reactor or combusted within a combustion chamber of the reactor 1. The combustion gases contact the feed from the inlet 4 and pyrolyze the feed to produce combustion products including particulate carbon black. The reactor 1 has the outlet thereof connected in flow communication with an indirect heat exchanger 5 such as a shell tube type heat exchanger via conduit means 6. A heat exchanger fluid such as water is introduced into, for example, the shell side of the heat exchanger 5 via an inlet 7 and is generally discharged as steam via an outlet 8. The inlet 9 to the tube side, for example, of the heat exchanger 5, receives effluent from the reactor 1 with the effluent flowing through the heat exchanger for discharge from an outlet 10 thereof to conduit means 11 connected in flow communication to the outlet 10. The conduit means 11 as illustrated includes a heat exchanger 12 connected in flow communication in the conduit means 11 for receiving effluent which can be used as the heat exchange medium for heating such fluids as air, carbonaceous feed and/or water (e.g., water charged at inlet 7) for use in the carbon black producing process as is known in the art. Effluent can be conducted from the conduit means 11 via a conduit 13, pressurized via a blower or pump 14 which is connected in flow communication to the conduit 13. The pump 14 is connected in flow communication to a conduit means 15 which conducts the cooled effluent back to the reactor 1 for use as a quench fluid as is known in the art.

Separating means 16 can be such as a bag filter or other suitable means for separating particulate carbon black from effluent gas which is connected in flow communication with the conduit means 11 for receiving effluent therefrom. The separator means 16 is operable for separating the effluent into an off-gas phase portion for discharge via an outlet conduit means 17 and a flocculent carbon black phase portion which is discharged via an outlet conduit means 18. The off-gas phase portion which is removed by conduit means 17 can be used as a carrier fluid via conduit means 50 as described more fully hereinbelow. The flocculent carbon black phase portion which is removed via outlet conduit means 18 can be utilized as cleaning carbon black via conduit means 31 as described blow. The outlet conduit means 18 connects the separator means 16 in flow communication to a pelleter 19 as is known in the art. The pelleter 19 is operable for forming the flocculent carbon black into pellets. For example, the pelleter 19 can be operable for wet pelletizing the flocculent carbon black into pellets. A suitable pelleting fluid or aqueous solution can be introduced into pelleter 19 via conduit means 53 for aiding in the pelleting of the carbon black.

A discharge conduit means 20 connects the pelleter 19 in flow communication to a screener 21 which is operable for receiving the pellets from the pelleter 19 and separating the pellets according to their size. Wet carbon black pellets can, for example, be removed from pelleter 19 via conduit means 20 which is in flow communication with screener 21. Screener 21 can be any suitable screener known in the art and is operable for receiving the wet pellets from the pelleter 19 and separating the pellets according to their size. Off-size specification pellets are discharged via a second discharge conduit means 24 for a purpose later described in which they are used as cleaning carbon black. Pellets of the desired size or on-specification pellets are discharged via a first discharge conduit means 22 to a dryer 23, for subsequent drying as known in the art.

Dryer 23 is operable to dry the wet on-size specification pellets received from screener 22 as is known in the art. Air in conduit means 51 and fuel in conduit means 52 are introduced into the combustion chamber of dryer 23 for providing heat to dry the pellets. The flue gas is removed by conduit means and a portion of the flue gas can be reintroduced by means of conduit 42 into the dryer 23 as a purge gas as illustrated. Dryer purge gas containing partially agglomerated carbon black, described in greater detail below, can be removed from the dryer via conduit means 43 and passed to a suitable filter or separator 44. Dried pellets are discharged from the dryer 23 via a discharge conduit means 25 and can be used as cleaning carbon black as described below.

Separator 44 can be any suitable filter, such as a bag filter, operable for separating the dryer purge gas into a cleaned purge gas portion and a particulate carbon black portion. The cleaned purge gas portion can be vented via conduit means 45 and the partially agglomerated carbon black can be used via conduit means 48 as cleaning carbon black as described in more detail below or recycled to the main carbon black production flow path, for example, via conduit means 47 to filter 16 for further processing as described above.

In accordance with the present invention cleaning carbon black is introduced continuously or intervallically as described below into heat exchanger 5 via conduit means 28. Conduit means 28 are connected in flow communication to the effluent inlet 9 of the heat exchanger 5. This can be accomplished in any number of ways as, for example, by the conduit means 28 opening into the conduit means 6 or the conduit means 28 can open into a portion of the reactor 1 (as shown in broken lines) as, for example, into the throat of the venturi of the reactor 1. A combination of such connections can also be utilized. Control valve means 29 are connected in the conduit means 28 and are operable for allowing continuous, sequential, or intervallic introduction of carbon black from a source of carbon black into the heat exchanger 5.

The cleaning carbon black introduced into the heat exchanger 5 via conduit means 28 can be from any suitable source of carbon black, either external of the apparatus, or more preferably from the carbon black producing apparatus downstream of the separating means 16. The cleaning carbon black can be, for example, flocculent carbon black via conduit means 31, off-size specification carbon black via conduit means 24, dried carbon black pellets via conduit means 37, or partially agglomerated carbon black from purge filter 44 via conduit means 48; and, in general, any suitable source of carbon black can be used. The cleaning carbon blacks as herein described encompass a wide range of sizes. For example, flocculent carbon black from filter means 16 can be in the range from about 10 to about 50 microns, partially agglomerated carbon black from purge filter 44 can be in the range from about 50 to about 120 microns, and carbon black pellets can range from about 120 to about 1000 microns or greater.

The cleaning carbon black from any suitable source must be introduced into heat exchanger 5 so as to increase the concentration of carbon black flowing therethrough to above the minimum cleaning concentration of carbon black. The minimum cleaning concentration of carbon black is the minimum concentration of carbon black at which the carbon black flowing through the heat exchanger is effective for removal of at least a portion of carbon black deposits from the inner peripheries of the tubes of the heat exchanger and/or to prevent accumulation of carbon black deposits thereon. Preferably, the concentration of carbon black flowing through the heat exchanger is increased to at least above about 6 pounds of carbon black per 1000 SCF. Preferably the amount of carbon black is increased to an amount in the range of about 6 pounds carbon black per 1000 SCF to about 35 pounds carbon black per 1000 SCF. More preferably the amount of carbon black is increased to an amount in the range of about 7.5 to about 35 lbs/1000 SCF.

It has been found quite advantageous to connect the conduit means 28 in flow communication to the carbon black outlet conduit means 18 for utilizing carbon black from the separator means 16 for continuous or intervallic introduction into the heat exchanger 5. In the illustrated structure, the flow communication can be in one of several manners depending upon the type or types or carbon black desired to be introduced into the heat exchanger 5. In the event it is desired to use flocculent carbon black, the conduit means 28 is connected in flow communication to the conduit means 18 via a conduit means 31 which opens into the conduit means 18. A control valve 32 is connected in the conduit means 31 for selectively permitting flow of particulate carbon black from the conduit means 18 to the conduit means 28. Further, as an optional method of operation, water can be introduced into the flocculent carbon black in the conduit means 31, as for example, through an inlet conduit means 33 in a suitable mixer (not shown) in the event it is desired to use wet flocculent carbon black as the cleaning carbon black. Preferably, the wet or wetted flocculent carbon black would have a moisture content in the range of between about 10 percent and 40 percent by weight.

In accordance with the invention, partially agglomerated carbon black, for example, such as from purge filter 44, can also be used as a source of cleaning carbon black to remove carbon deposits from the inner peripheries of the tubes of indirect heat exchanger 5 by passing the partially agglomerated carbon black from filter 44 via conduit means 46 and conduit means 48. A control valve 49, for example, a time or temperature responsive control valve, is positioned in conduit means 48 so that the partially agglomerated carbon black can be passed to heat exchanger 5 intermittently in accordance with timed intervals or in accordance with intervals determined by the temperature from the effluent stream from heat exchanger 5. Or, if desired, valve 49 can be open all the time so that partially agglomerated carbon black can be continuously passed to heat exchanger 5. Any carrier fluid can be used. For example, a fluid stream available in the carbon black production process can be used for conveying the cleaning carbon black to the heat exchanger 5 for removal of carbon black deposits. For example, an off-gas stream 50 can be connected in flow communication with cleaning carbon black stream 48 and valve 49 to convey the cleaning carbon black. Alternatively stream 48' (shown in dashed lines) can be connected in flow communication with an eductor 41.

The cleaning carbon black in line 48 can be introduced continuously into heat exchanger 5, or periodically, or at nonuniform intervals as determined by the particular carbon black producing process. For example, the valve 29 can be operated by suitable valve control means 54 which can open the valve 29 in the event the effluent exiting heat exchanger 5 is at too high a value, indicating a relatively low heat transfer rate; or a temperature control means 54 can be used to regulate or control the opening and closing of valve 29. Valve 29 can also be connected to a time control means (not shown) which would open and close the valve at regularly spaced intervals or at nonuniform intervals to permit the introduction of cleaning carbon black into heat exchanger 5 in an amount effective to remove at least a portion of the carbon black deposits from the inner peripheries of the tubes of heat exchanger 5.

Carbon black pellets can also be utilized as the carbon black introduced for cleaning the heat exchanger 5. To accomplish this, a conduit means 35 connects the conduit means 28 in flow communication to the discharge conduit means 24 and opens into the conduit means 24 for using off-size specification carbon black pellets. A control valve 36 is connected in the conduit means 35 for selectively permitting the use of off-specification carbon black pellets directly from the screener as the cleaning carbon black.

Also, carbon black pellets from the dryer 23 can be utilized as the cleaning carbon black. To accomplish this, conduit means 37 connects the conduit means 28 in flow communication to the discharge conduit means 25 and opens into the discharge conduit means 25. A control valve 38 is connected in the conduit means 37 for selectively permitting the use of pellets from the dryer as the cleaning carbon black.

It is to be noted that any combination of one or more of the flocculent carbon black either wet or relatively dry from the conduit means 31, pelleted carbon black from the screener 21, partially agglomerated carbon black from, for example, the purge gas filter 44, and/or carbon black pellets from the dryer 23 can be utilized as the cleaning carbon black and the combinations can be readily effected by manipulation of the valves 32, 36, 49, and 38.

To effect conveying of the cleaning carbon black to the heat exchanger 5, it has been found that a fluid carrier can be utilized in an effective manner. Any suitable source of fluid carrier can be provided. As illustrated, the source of fluid carrier is effluent from the conduit means 11. Preferably, the carrier fluid is taken from the effluent at a point flowwise downstream of the blower or pump 14 which would be from the conduit means 15. This is highly advantageous in that the fluid carrier has already been pressurized by the blower or pump 14 and therefore another blower or pump would not necessarily be required. Conduit means 40 connects the conduit means 28 to the source of carrier fluid. Any means known in the art for effecting conveying of the carbon black by the carrier fluid can be utilized. Such means can be, for example, off-gas stream 50 as shown. Such means can also be an eductor 41 connected in the conduit means 28 and connected to the conduit means 40, with each of the conduit means 31, 35, 37 or 48 having a respective eductor 41 or utilizing the same eductor 41 as illustrated.

The cleaning carbon black is continuously introduced or is intervallically introduced into the heat exchanger 5 either periodically, or at nonuniform intervals, or at random intervals as is determined by the particular carbon black producing process. The valve 29 can be controlled by suitable control means 54 which would open the valve 29 in the event the effluent exiting the heat exchanger 5 is at too high a temperature indicating a relatively low heat transfer rate. The valve 29 can also be connected to timer means (not shown) which would open and close the valve 29 at regularly spaced intervals or nonuniform intervals or random intervals, preferably at regular intervals, to permit the introduction of cleaning carbon black into the heat exchanger 5. The valve 29 is maintained in an open condition to permit a sufficient quantity of carbon black to be introduced into the heat exchanger 5 to effect the cleaning.

The carbon black added is in an amount sufficient to remove at least a portion of the carbon black deposits from the heat exchanger. Also, it is preferred that the carbon black be added in a sufficiently short time interval that the concentration of the total carbon black passing through the heat exchanger will be high enough to effect removal of at least a portion of the carbon black deposits. In operation, the cleaning carbon black is added in an amount to achieve an increase of concentration of the carbon black flowing through the heat exchanger in the range of between about 2 lbs/1000 SCF to about 35 lbs/1000 SCF of effluent flowing through the heat exchanger 5 more preferably about 4 lbs/1000 SCF to about 35 lbs/1000 SCF. As indicated above, it is desired that the concentration of carbon black flowing through the heat exchanger during cleaning be in the range of about 6 to about 35 lbs/1000 SCF, more preferably in the range of about 7.5 to about 35 lbs/1000 SCF. For many carbon black producing processes this cleaning concentration can be achieved by adding additional carbon black to achieve an increase of carbon black between about 2 lbs/1000 SCF to about 35 lbs/1000 SCF, more preferably between about 4 lbs/1000 SCF to about 35 lbs/1000 SCF.

In one preferred embodiment of the present invention cleaning carbon black can be continuously introduced into the heat exchanger, for example, via conduit means 31, or alternatively via at least one of conduit means 24, 37, 48, and 48'. This continuous introduction of cleaning carbon black is currently considered most preferable because of its simplicity and ease of operation and maintenance.

In another preferred embodiment of the present invention, cleaning carbon black is added intervallically, for example, cleaning carbon black can be added at least once during a unit period of time in an amount in the range of between about 1 percent and about 10 percent of the carbon black passing through the heat exchanger during that period of time. Preferably, the amount of carbon black is in the range of between about 2 percent to about 4 percent of the carbon black passing through per the unit time. Preferably, the unit time is a period of one hour. It is preferred that cleaning carbon black be introduced in the range of between about 2 times to about 60 times per hour and more preferably in the range of about 4 to about 24 times per hour. Further, the time duration of each introduction of cleaning carbon black is in the range of between about ¼ second to about 10 seconds and preferably in the range of about between ½ second to about 3 seconds. It is preferred that the effluent flow through the effluent flow path at a speed of at least about 180 ft/sec. and more preferably at least about 200 ft/sec.

It is to be noted that for each introduction of carbon black during the unit time period, the amount of cleaning carbon black introduced can be equal amounts of cleaning carbon black for each period of introduction or can be unequal amounts. However, it is preferred that the amounts be generally equal.

In order to illustrate operability of the present invention, the following examples are provided. Example I is a calculated example representing continuous introduction of cleaning carbon black. Example II is an operating example showing data from runs in which cleaning carbon black is intervallically introduced into heat exchanger 5.

| Example I (Calculated) | |
|---|---|
| Air charged to carbon black reactor, SCF/hr. | 215,000 |
| Temperature of air, deg F. | 800 |
| Feedstock charged to carbon black reactor, gal/hr. | 330 |
| BMCI | 120 |
| Midboiling point, deg F. | 700 |
| Effluent smoke from carbon black reactor: | |
| Temperature, deg F. | 2600 |
| Rate, SCF/hr. | 229,300 |
| Lbs carbon black/hr | 1,100 |
| Lbs carbon black/1000 SCF | 4.8 |
| Smoke quench to carbon black reactor: | |
| Temperature, deg F. | 400 |
| Rate, SCF/hr. | 86,000 |
| Lbs carbon black/hr. | 516 |
| Lbs carbon black/1000 SCF | 6 |
| Quenched smoke from carbon black reactor: | |
| Temperature, deg F. | 2000 |
| Rate, SCF/hr. | 315,300 |
| Lbs carbon black/hr. | 1,616 |
| Lbs carbon black/1000 SCF | 5.13 |
| Flocculent carbon black from filter size range, microns | 10 to 50 |
| Lbs carbon black/hr. | 275 |
| Lbs flocculent carbon black from filter added for 1000 SCF to heat exchangers. | 0.86 |
| Carrier gas from heat exchangers: | |
| Temperature, deg F. | 400 |
| Rate, SCF/hr. | 5,500 |
| Lbs carbon black/hr. | 33 |
| Lbs carbon black/1000 SCF | 6 |
| Charge to heat exchanger: | |
| Temperature, deg F. | 2000 |
| Rate, SCF/hr. | 320,800 |
| Lbs carbon black/hr. | 1,924 |
| Lbs carbon black/1000 SCF | 6 |
| Effluent from heat exchanger: | |
| Temperature, deg F. | 2000 |
| Rate, SCF/hr. | 320,800 |
| Lbs carbon black/hr. | 1,924 |
| Lbs carbon black/1000 SCF | 6 |
| Yield to Filter 16: | |
| Temperature, deg F. | 400 |
| Rate, SCF/hr. | 229,300 |
| Lbs carbon black/hr. | 1,375 |
| Lbs carbon black/1000 SCF | 6 |
| Carbon black from filter 16, Lbs/hr. | 1,375 |
| Carbon black yield to pelleter, Lbs/hr. | 1,100 |
| Off-gas, SCF/hr. | 229,300 |

EXAMPLE II

|  | Run 1 | Run 2 | Run 3 |
|---|---|---|---|
| Carbon black made, lbs/hr. | 30 | 30 | 30 |
| Pounds of Carbon Black/1000 SCF in effluent | 3.53 | 3.53 | 3.53 |
| Pounds of carbon black made per second and introduced into exchanger. | 0.00833 | 0.00833 | 0.00833 |
| Cleaning carbon black charged to heat exchanger: | | | |
| Wt. % of carbon black made | 2.0 | 3.0 | 6.7 |
| Lbs/hr. | 0.6 | 0.9 | 2.0 |
| Cleaning carbon black injection interval in minutes. | 2.5 | 2.5 | 2.5 |
| Pounds of cleaning carbon black added per injection (24 injections per hour). | 0.025 | 0.038 | 0.083 |
| Lbs/Sec. of cleaning carbon black injected (1.25 seconds injection time). | 0.020 | 0.031 | 0.066 |
| Total carbon black concentration (made and cleaning carbon black) during one second's time, lbs. | 0.02833 | 0.03933 | 0.07433 |
| Total carbon black in effluent during the one second time: | | | |
| Grains/100 SCF | 8,420 | 11,700 | 22,100 |
| Lbs/1000 SCF | 12.0 | 16.7 | 31.6 |
| Overall heat transfer coefficient "U" BTU/hr.-ft$^2$-°F.* | 6 | 6.6 | 8.2 |
| Ratio of "Loading" during this one second time to original effluent "Loading". | $\frac{0.02833}{0.00833} = 3.4$ | $\frac{0.03933}{0.00833} = 4.7$ | $\frac{0.07433}{0.00833} = 8.9$ |

*The "U" value before introduction of the cleaning carbon black was about 3 BTU/hr.-ft$^2$-°F.

It is to be noted that by the use of the present invention in Example II the overall heat transfer coefficient was at least doubled over the heat transfer coefficient of the heat exchanger before cleaning in each of the runs and in one of the runs the overall heat transfer coefficient was almost tripled.

It is to be understood that while there has been illustrated and described certain forms of the present invention, it is not to be limited to the specific form or arrangement of parts or steps herein described and shown except to the extent that such limitations or their equivalents are found in the claims.

That which is claimed is:

1. In a process for producing carbon black by pyrolysis of a feed hydrocarbon, wherein a gas stream containing carbon black is passed through a means defining a flow path of an indirect heat exchanger on which carbon black deposits are laid down reducing heat transfer efficiency, the improvement comprising cleaning carbon black deposits from said means defining a flow path by:
   introducing a mixture containing fluid carrier and additional cleaning carbon black into said means defining a flow path of the heat exchanger, said mixture containing a sufficient amount of additional cleaning carbon black to increase the concentration of carbon black flowing through the means defining a flow path to a concentration effective to remove at least a portion of said carbon black deposits from said means defining a flow path; and by
   flowing said mixture along with said gas stream through said means defining a flow path and thereby removing at least a portion of said carbon black deposits from said means defining a flow path.

2. A method as in claim 1 wherein: the additional cleaning carbon black is flowed through the means defining a flow path continuously.

3. A method as in claim 2 wherein: the additional cleaning carbon black is added in an amount effective to raise the concentration of carbon black flowing through the means defining a flow path to above at least about 6 pounds per 1000 SCF.

4. A method as in claim 3 wherein: the concentration of carbon black flowing through the means defining a flow path is increased to a concentration in the range of about 6 to about 35 pounds per 1000 SCF.

5. A method as in claim 4 wherein: the concentration of carbon black flowing through the means defining a flow path is increased to a concentration in the range of about 7.5 to about 35 pounds per 1000 SCF.

6. A method as in claim 5 further comprising:
   pyrolyzing a hydrocarbon feedstock in the presence of hot combustion gases to produce an effluent stream comprising carbon black;
   cooling the effluent stream in the means defining a flow path of the indirect heat exchanger
   filtering carbon black from the thus cooled effluent stream to product flocculent carbon black, and
   using at least a portion of the thus produced flocculent carbon black as the additional cleaning carbon black.

7. A method as in claim 6 further comprising:
   wet pelletizing the flocculent carbon black, and
   using at least a portion of the thus wet-pelletized carbon black as the additional cleaning carbon black.

8. A method as in claim 6 wherein: the flocculent carbon black has a moisture content in the range of about 10 to about 40 percent by weight.

9. A method as in claim 7 wherein:
the wet pelletized carbon black is dried and at least a portion of the thus dried carbon black pellets is used as the additional cleaning carbon black.

10. A method as in claim 1 wherein:
the additional cleaning carbon black is intervallically introduced into the means defining a flow path.

11. A method as in claim 10 wherein:
the additional cleaning carbon black is added in an amount effective to raise the concentration of carbon black flowing through the means defining a flow path to above at least about 6 pounds per 1000 SCF.

12. A method as in claim 10 wherein:
the concentration of carbon black flowing through the means defining a flow path is increased to a concentration in the range of about 6 to about 35 pounds per 1000 SCF.

13. A method as in claim 10 wherein:
the concentration of carbon black flowing through the means defining a flow path is increased to a concentration in the range of about 7.5 to about 35 pounds per 1000 SCF.

14. A method as in claim 10 wherein:
said additional cleaning carbon black is intervallically introduced into the means defining a flow path of the heat exchanger in an amount sufficient to increase the carbon black flowing therethrough by an amount in the range of about 2 to about 35 pounds per 1000 SCF.

15. A method as in claim 10 wherein:
said additional cleaning carbon black is intervallically introduced into the means defining a flow path of the heat exchanger in an amount sufficient to increase the carbon black flowing therethrough by an amount in the range of about 4 to about 35 pounds per 1000 SCF.

16. A method as in claim 10 wherein:
said additional cleaning carbon black is introduced for a first time period in the range of about ¼ second to about 10 seconds.

17. A method as in claim 10 wherein:
said first time period is in the range of about ½ second to about 3 seconds 18. A method as in claim 10 wherein:
said additional cleaning carbon black is introduced in the range of about 2 times to about 60 times per hour.

19. A method as in claim 10 wherein:
said additional cleaning carbon black is introduced in the range of about 4 times to about 24 times per hour.

20. A method as in claim 10 wherein:
said additional cleaning carbon black is introduced in an amount per hour in the range of about 1 percent to about 10 percent of the amount per hour of carbon black in the gas stream flowing to the heat exchanger.

21. A method as in claim 10 wherein:
said additional cleaning carbon black is introduced in an amount per hour in the range of about 2 percent to about 4 percent of the amount per hour of carbon black in the gas stream flowing to the heat exchanger.

22. A method as in claim 10 wherein:
said additional cleaning carbon black includes pelleted carbon black.

23. A method as in claim 10 wherein:
said additional cleaning carbon black includes flocculent carbon black.

24. A method as in claim 23 wherein:
said flocculent carbon black is dry flocculent carbon black.

25. A method as in claim 23 wherein:
said flocculent carbon black is wet flocculent carbon black.

26. A method as in claim 25 wherein:
said wet flocculent carbon black has a moisture content in the range of about 10 percent to about 40 percent by weight.

27. A method as in claim 10 wherein:
said additional cleaning carbon black includes at least a portion of carbon black produced in said carbon black producing process.

28. In an apparatus for producing carbon black wherein a gas stream containing carbon black is cooled in means defining a flow path of an indirect heat exchanger on which carbon black deposits are laid down which reduce heat transfer efficiency, the improvement comprising:
means for flowing additional cleaning carbon black into the means defining a flow path to increase the concentration of carbon black flowing therethrough to a concentration effective to remove at least a portion of such carbon black deposits from the heat exchanger.

29. An apparatus as in claim 28 wherein the apparatus for producing carbon black further comprises:
a carbon black reactor having inlet means for fuel, air, and feed, and an outlet;
a first indirect heat exchanger having inlet means connected in flow communication with the outlet of the carbon black reactor to receive effluent therefrom, outlet means for discharging the thus received effluent from the heat exchanger, and means defining a flow path connecting the inlet means in flow communication with the outlet means; and
separating means for separating effluent received from the heat exchanger into an off-gas phase portion and a flocculent carbon black phase portion, said separating means further having inlet means connected in flow communication with the outlet means of the first indirect heat exchanger for receiving effluent therefrom, first outlet means for discharging said off-gas phase portion from said separating means, and second outlet means for discharging said flocculent carbon black phase portion from said separating means.

30. Apparatus as in claim 29 wherein:
said means for flowing additional cleaning carbon into the heat exchanger comprises conduit means connected in flow communication between said second outlet means of said separating means and said inlet means of said first indirect heat exchanger and operable for conveying flocculent carbon black from said separating means to the first indirect heat exchanger for use as said additional cleaning carbon black.

31. Apparatus for producing carbon black as in claim 29 further comprising:
pelleter means for receiving and pelletizing flocculent carbon black received from the second outlet of the separating means;
conduit means connected in flow communication between the second outlet means of the separating means and the pelleter for conveying flocculent carbon black from the separating means to the pelleter means;

screener means for receiving pellets from the pelleter and separating the pellets according to size into an on-size specification portion and an off-size specification portion; and dryer means for receiving and drying on-size specification pellets from the screener means to produce dry carbon black pellets.

32. Apparatus as in claim 31 wherein said means for flowing additional carbon black into the heat exchanger comprises conduit means for conveying at least a portion of wet pelleted carbon black from the pelleter to the heat exchanger.

33. Apparatus as in claim 31 wherein said means for flowing additional carbon black into the heat exchanger comprises conduit means for conveying at least a portion of off-size specification pellets from the screening means to the heat exchanger.

34. Apparatus as in claim 31 wherein said means for flowing additional carbon black into the heat exchanger comprises conduit means for conveying at least a portion of the dried carbon black pellets from the dryer means to the heat exchanger.

* * * * *